United States Patent
Thomas

[19]

[11] Patent Number: 5,912,432
[45] Date of Patent: Jun. 15, 1999

[54] PROTECTIVE ELECTRICAL OUTLET COVER

[76] Inventor: Ieshea L. Thomas, 751 E. Norwegian St., Pottsville, Pa. 17901

[21] Appl. No.: 09/010,746

[22] Filed: Jan. 22, 1997

[51] Int. Cl.[6] ....................................... H05K 5/03
[52] U.S. Cl. ............................. 174/67; 220/242; 439/144
[58] Field of Search .................. 174/66, 67; 220/3.8, 220/241, 242; 439/144, 142; 361/118; 292/202, 210, 281, 285

[56] References Cited

U.S. PATENT DOCUMENTS

| | | | |
|---|---|---|---|
| 1,513,234 | 10/1924 | Fritsch | 292/202 X |
| 2,880,264 | 3/1959 | Ruskin | 174/67 |
| 2,891,102 | 6/1959 | Grimes | 174/67 |
| 3,140,344 | 7/1964 | Slater et al. | 174/67 |
| 3,200,989 | 8/1965 | Hubbell | 174/67 X |
| 3,369,153 | 2/1968 | Arnold et al. | 361/118 X |
| 3,452,252 | 6/1969 | Mapham | 361/118 X |
| 4,451,101 | 5/1984 | Davis | 174/67 X |
| 4,484,185 | 11/1984 | Graves | 174/66 X |
| 4,874,906 | 10/1989 | Shotey | 174/67 |
| 4,915,638 | 4/1990 | Domian | 174/67 X |
| 5,252,083 | 10/1993 | Correnti | 174/67 X |
| 5,317,108 | 5/1994 | Prairie, Jr. | 174/67 |
| 5,389,740 | 2/1995 | Austin | 174/67 |

*Primary Examiner*—Dean A. Reichard

[57] ABSTRACT

A PROTECTIVE ELECTRICAL OUTLET COVER for helping prevent electrical cords from being pulled from an electrical outlet. The device includes a base plate having a pair of receptacle openings for aligning adjacent the electrical receptacles of an electrical outlet. A cover box is hingedly coupled at one of its end walls of its perimeter wall to one of the end edges of the base plate to permit pivoting of the cover box between an open position and a closed position in relation to the base plate. When in the closed position, the base plate substantially covers the cover box interior space. Another of the end walls of the cover box perimeter wall is detachably coupled to another of the end edges of the base plate when the cover box is positioned in the closed position. Additionally, through each side wall of the cover box perimeter wall are a pair of spaced apart cord slots designed for permitting extension of an electrical cord therethrough.

1 Claim, 2 Drawing Sheets

PROTECTIVE ELECTRICAL OUTLET COVER

BACKGROUND OF THE INVENTION

1. Field of the Invention

The present invention relates to electrical outlet covers and more particularly pertains to a new protective electrical outlet cover for helping prevent electrical cords from being pulled from an electrical outlet.

2. Description of the Prior Art

The use of electrical outlet covers is known in the prior art. More specifically, electrical outlet covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art electrical outlet covers include U.S. Pat. No. 5,382,755; U.S. Pat. No. 5,045,640; U.S. Pat. No. 4,851,612; U.S. Pat. No. 4,603,932; U.S. Pat. No. 5,174,773; and U.S. Pat. No. Des. 342,235.

While these devices fulfill their respective, particular objectives and requirements, the aforementioned patents do not disclose a new protective electrical outlet cover. The inventive device includes a base plate having a pair of receptacle openings for aligning adjacent the electrical receptacles of an electrical outlet. A cover box is hingedly coupled at one of its end walls of its perimeter wall to one of the end edges of the base plate to permit pivoting of the cover box between an open position and a closed position in relation to the base plate. When in the closed position, the base plate substantially covers the cover box interior space. Another of the end walls of the cover box perimeter wall is detachably coupled to another of the end edges of the base plate when the cover box is positioned in the closed position. Additionally, through each side wall of the cover box perimeter wall are a pair of spaced apart cord slots designed for permitting extension of an electrical cord therethrough.

In these respects, the protective electrical outlet cover according to the present invention substantially departs from the conventional concepts and designs of the prior art, and in so doing provides an apparatus primarily developed for the purpose of helping prevent electrical cords from being pulled from an electrical outlet.

SUMMARY OF THE INVENTION

In view of the foregoing disadvantages inherent in the known types of electrical outlet covers now present in the prior art, the present invention provides a new protective electrical outlet cover construction wherein the same can be utilized for helping prevent electrical cords from being pulled from an electrical outlet.

The general purpose of the present invention, which will be described subsequently in greater detail, is to provide a new protective electrical outlet cover apparatus and method which has many of the advantages of the electrical outlet covers mentioned heretofore and many novel features that result in a new protective electrical outlet cover.

To attain this, the present invention generally comprises a base plate having a pair of receptacle openings for aligning adjacent the electrical receptacles of an electrical outlet. A cover box is hingedly coupled at one of its end walls of its perimeter wall to one of the end edges of the base plate to permit pivoting of the cover box between an open position and a closed position in relation to the base plate. When in the closed position, the base plate substantially covers the cover box interior space. Another of the end walls of the cover box perimeter wall is detachably coupled to another of the end edges of the base plate when the cover box is positioned in the closed position. Additionally, through each side wall of the cover box perimeter wall are a pair of spaced apart cord slots designed for permitting extension of an electrical cord therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new protective electrical outlet cover apparatus and method which has many of the advantages of the electrical outlet covers mentioned heretofore and many novel features that result in a new protective electrical outlet cover.

It is another object of the present invention to provide a new protective electrical outlet cover which may be easily and efficiently manufactured and marketed.

It is a further object of the present invention to provide a new protective electrical outlet cover which is of a durable and reliable construction.

An even further object of the present invention is to provide a new protective electrical outlet cover which is susceptible of a low cost of manufacture with regard to both materials and labor, and which accordingly is then susceptible of low prices of sale to the consuming public, thereby making such protective electrical outlet cover economically available to the buying public.

Still yet another object of the present invention is to provide a new protective electrical outlet cover which provides in the apparatuses and methods of the prior art some of the advantages thereof, while simultaneously overcoming some of the disadvantages normally associated therewith.

Still another object of the present invention is to provide a new protective electrical outlet cover for helping prevent electrical cords from being pulled from an electrical outlet.

Yet another object of the present invention is to provide a new protective electrical outlet cover which includes a base plate having a pair of receptacle openings for aligning adjacent the electrical receptacles of an electrical outlet. A cover box is hingedly coupled at one of its end walls of its perimeter wall to one of the end edges of the base plate to permit pivoting of the cover box between an open position and a closed position in relation to the base plate. When in the closed position, the base plate substantially covers the cover box interior space. Another of the end walls of the cover box perimeter wall is detachably coupled to another of the end edges of the base plate when the cover box is positioned in the closed position. Additionally, through each side wall of the cover box perimeter wall are a pair of spaced apart cord slots designed for permitting extension of an electrical cord therethrough.

Still yet another object of the present invention is to provide a new protective electrical outlet cover that is child resistant.

Even still another object of the present invention is to provide a new protective electrical outlet cover that helps prevent accidental removal of an electrical cord from an outlet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
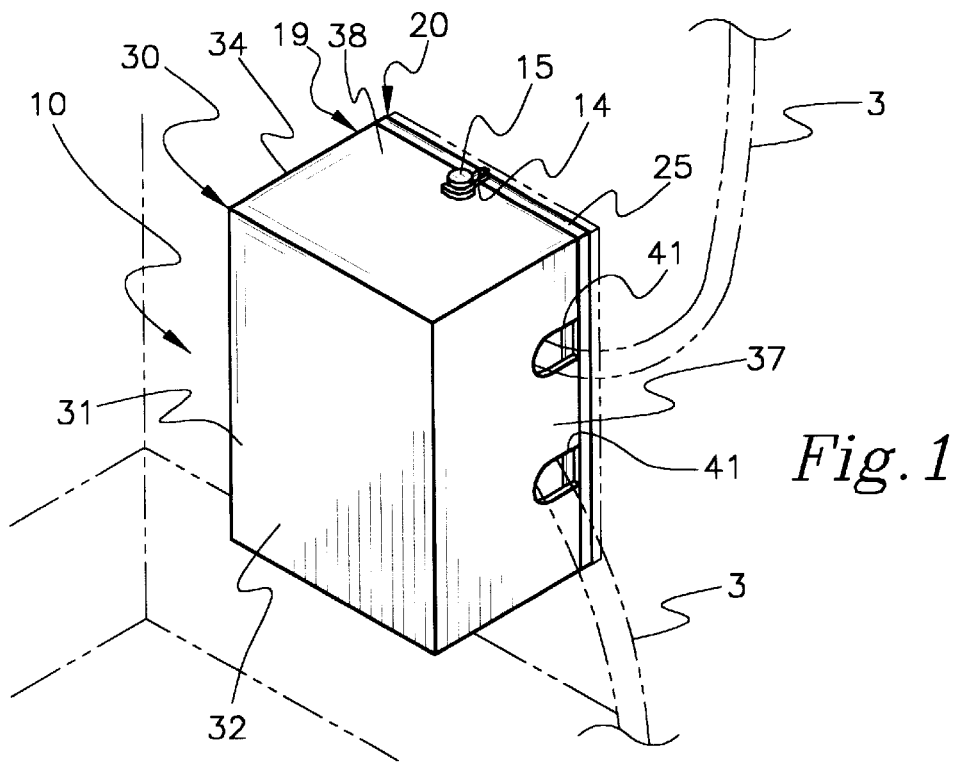
FIG. 1 is a schematic perspective view of a new protective electrical outlet cover in the closed position according to the present invention.

With reference now to the drawings, and in particular to FIGS. 1 through 4 thereof, a new protective electrical outlet cover embodying the principles and concepts of the present invention and generally designated by the reference numeral 10 will be described.

As best illustrated in FIGS. 1 through 4, the protective electrical outlet cover 10 generally comprises a base plate 20 having a pair of receptacle openings 27 for aligning adjacent the electrical receptacles 2 of an electrical outlet 1. A cover box 30 is hingedly coupled at one of its end walls 39 of its perimeter wall 34 to one of the end edges 26 of the base plate 20 to permit pivoting of the cover box 30 between an open position 18 and a closed position 19 in relation to the base plate 20. When in the closed position 19, the base plate 20 substantially covers the cover box interior space 40. Another of the end walls 38 of the cover box perimeter wall 34 is detachably coupled to another of the end edges 25 of the base plate 20 when the cover box 30 is positioned in the closed position 19. Additionally, through each side wall 36,37 of the cover box perimeter wall 34 are a pair of spaced apart cord slots 41 designed for permitting extension of an electrical cord 3 therethrough.

Figure 2:
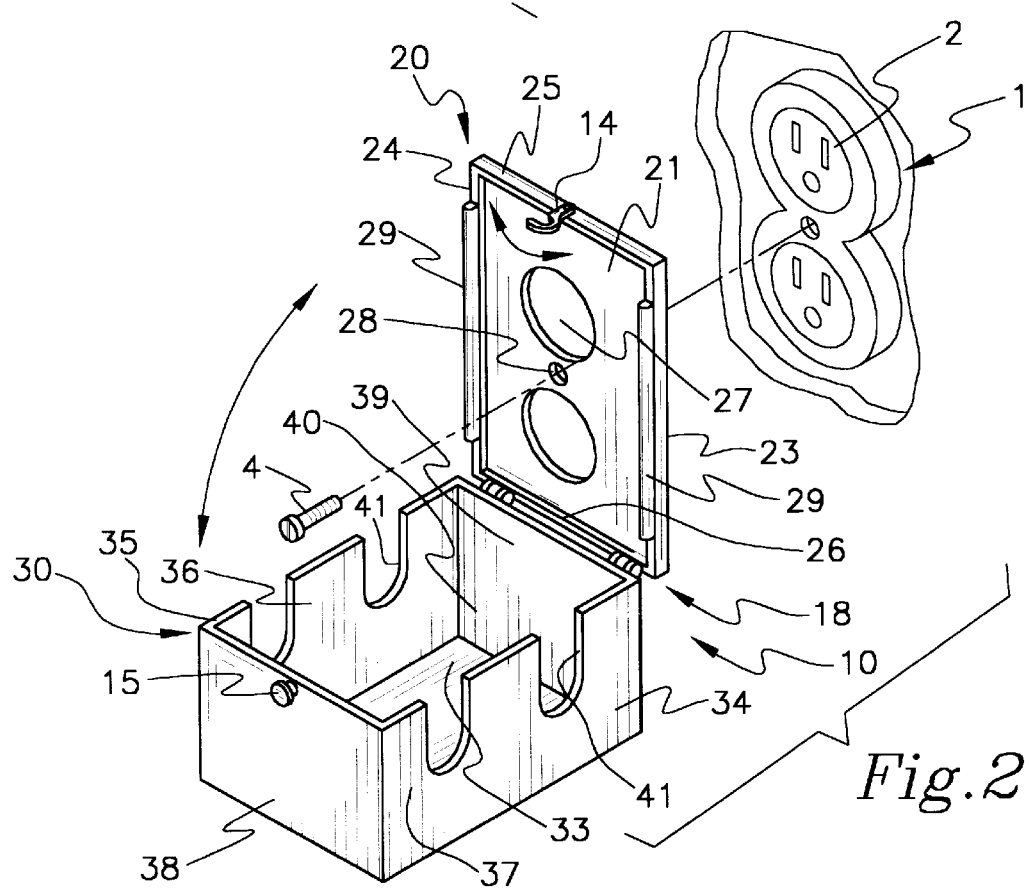
FIG. 2 is a schematic perspective view of the present invention in the open position.

With particular reference to FIG. 2, the base plate 20 is preferably rectangular and has front and back surfaces 21,22 with the back surface designed for abutting adjacent an electrical outlet 1. Through the base plate 20 are a pair of receptacle openings 27 each designed for aligning adjacent the electrical receptacles 2 of an electrical outlet 1. Ideally, the base plate also includes a screw hole 28 extending through it for inserting a fastener 4 through it to secure the base plate 20 to the electrical outlet 1.

The base plate also includes a pair of opposite end edges 25,26 and a pair of opposite sides edges 23,24 extending between the end edges 25,26. Preferably, each of the side edges 23,24 of the base plate 20 has an elongate locking tab 29 outwardly extending from the front surface 21 of the base plate 20.

The cover box 30 is also rectangular in shape and has a rectangular front plate 31 having front and back surfaces 32,33. The cover box further includes a perimeter wall 34 extending around the outer perimeter of the front plate 31 outwardly from the back surface 33 of the front plate 31 to define a cover box interior space 40. The perimeter wall 34 has a terminal edge and preferably comprises a pair of opposite side walls 36,37 and a pair of opposite end walls 38,39. Each side wall 36,37 has a pair of spaced apart cord slots 41 being extended from the terminal edge 35 of the perimeter wall 34 towards the front plate 31. The cord slots 41 are designed for permitting extension of an electrical cord 3 therethrough.

Figure 3:
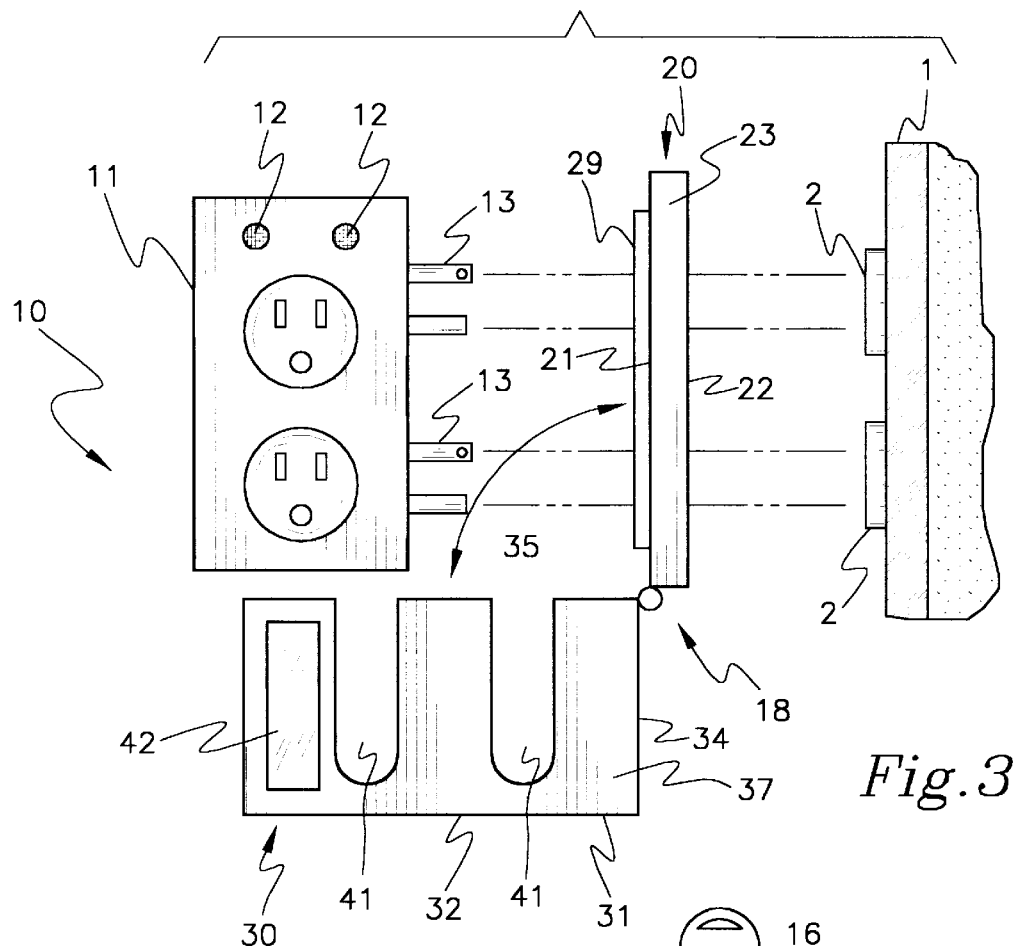
FIG. 3 is a schematic exploded side view of the present invention with the optional electrical surge protector device.

As illustrated in FIGS. 2 and 3, one of the end walls 39 of the cover box perimeter wall 34 is hingedly coupled to one of the end edges 26 of the base plate 20 to permit pivoting of the cover box 30 between an open position 18, (FIG. 2) and a closed position 19 (FIG. 1) in relation to the base plate 20. When in the closed position 19, the base plate 20 substantially covers the cover box interior space 40 such that the back surface 33 of the cover box front plate 31 faces the front surface 21 of the base plate 20 with the locking tabs 29 disposed within the cover box interior space 40 and engaging the side walls 36,37 of the cover box perimeter wall 34 to help secure the cover box 30 to the base plate 20.

As shown in FIGS. 1 and 2, the protective cover 10 preferably includes a locking hasp 14 pivotally coupled to the free end edge 25 of the base plate 20 and a locking pin 15 extending from the free of the end wall 38 of the cover box perimeter wall 34. When the cover box 30 is positioned in the closed position 19, the locking hasp 14 is releasably engagable to the locking pin 15 to help secure the cover box 30 to the base plate 20.

Figure 4:
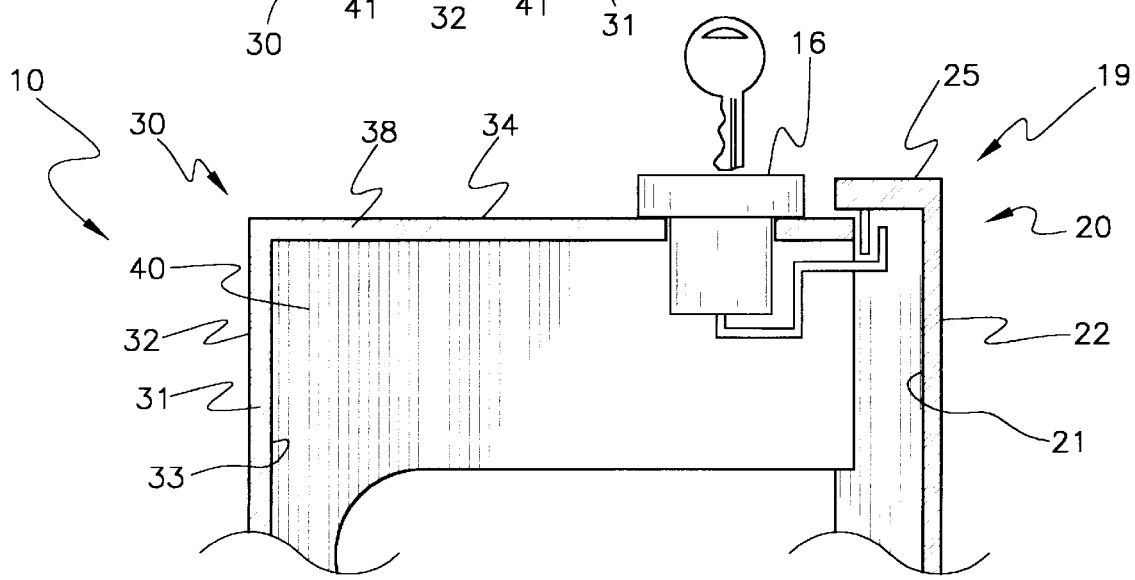
FIG. 4 is a schematic partial sectional view of the present invention with the optional locking member.

Optionally, as illustrated in FIG. 4, instead of the locking hasp 14 and locking pin 15, the protective cover 10 may include a lock member 16 on the free end wall 38 of the cover box perimeter wall 34. The lock member 16 permits releasably locking of the end wall 38 to the free end edge 25 of the base plate 20 when the cover box is positioned in the closed position 19 to secure the cover box 30 to the base plate 20.

In an ideal optional embodiment, the protective cover 10 may further include a typical electrical surge protector device 11 having at least one pair of insertion blades 13 for inserting into a receptacle 2 of an electrical outlet 1. As shown in FIG. 3, the electrical surge protector device 11 is positioned adjacent the front surface 21 of the base plate 20 with the insertion blades 13 inserted through one of the receptacle openings 27 of the base plate 20 so that the electrical surge protector device is disposed within the cover box interior space 40 when the cover box 30 is positioned in the closed position 19. Ideally, the cover box 30 includes a view window 42 through one of the side walls 37 to permit viewing of any indicator lights 12 on the surge protector 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical outlet protective cover, comprising:

a base plate having front and back surfaces, a pair of opposite end edges and a pair of opposite side edges being extended between said end edges, said back surface being for abutting an electrical outlet, said base plate having a pair of receptacle openings, said receptacle openings being for aligning adjacent electrical receptacles of an electrical outlet;

a cover box having a front plate, and a perimeter wall, said front plate having front and back surfaces, said perimeter wall of said cover box being extended around an outer perimeter of said front plate outwardly from said back surface of said front plate to define a cover box interior space;

said perimeter wall having a terminal edge, said perimeter wall including a pair opposite side walls, and a pair of opposite end walls, each of said side walls having a pair of spaced apart cord slots being extended from said terminal edge of said perimeter wall towards said front plate to a point immediately adjacent said front plate, each said cord slot being for permitting extension of an electrical cord therethrough;

one of said end walls of said cover box perimeter wall being hingedly coupled to one of said end edges of said base plate, said cover box being pivotable between an open position and a closed position in relation to said base plate, said base plate substantially covering said cover box interior space when said cover box is positioned in said closed position, said back surface of said cover box front plate facing said front surface of said base plate when said cover box is positioned in said closed position, said other of said end walls of said cover box perimeter wall being detachably coupled to the other of said end edges of said base plate when said cover box is positioned in said closed position; and an electrical surge protector device having at least one pair of insertion blades for inserting into an electrical outlet, said electrical surge protector device being positioned adjacent said front surface of said base plate, said pair of insertion blades being inserted through said one of said receptacle openings of said base plate, said electrical surge protector device being disposed within said cover box interior space when said cover box is positioned in said closed position, wherein outlets of the surge protector are in electrical communication with the insertion blades and positioned in perpendicular relationship therewith, wherein a pair of laterally spaced indicator lights are positioned on a face of the surge protector device on which the outlets are positioned and further situated above the outlets;

wherein one of the side walls of the perimeter wall of the cover box has a substantially rectangular window positioned above the slots for viewing the indicator lights on the surge protector.

\* \* \* \* \*